US010719406B1

(12) United States Patent
Patwardhan et al.

(10) Patent No.: US 10,719,406 B1
(45) Date of Patent: Jul. 21, 2020

(54) ENHANCED FINGERPRINT COMPUTATION FOR DE-DUPLICATED DATA

(71) Applicant: EMC Corporation, Hopkinton, MA (US)

(72) Inventors: Kedar Shrikrishna Patwardhan, Pune (IN); Mangesh Sudhir Nijasure, Pune (IN); Veeral Shah, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 996 days.

(21) Appl. No.: 15/190,448

(22) Filed: Jun. 23, 2016

(51) Int. Cl.
*G06F 16/00* (2019.01)
*G06F 11/14* (2006.01)
*G06F 16/11* (2019.01)
*G06F 16/16* (2019.01)
*G06F 16/25* (2019.01)
*G06F 16/174* (2019.01)

(52) U.S. Cl.
CPC .......... *G06F 11/1453* (2013.01); *G06F 16/11* (2019.01); *G06F 16/16* (2019.01); *G06F 16/1748* (2019.01); *G06F 16/258* (2019.01)

(58) Field of Classification Search
CPC .... G06F 11/1453; G06F 16/16; G06F 16/258; G06F 16/1748; G06F 16/11
USPC ........................................................ 707/639
See application file for complete search history.

(56) References Cited

U.S. PATENT DOCUMENTS

| 8,392,384 | B1* | 3/2013 | Wu | G06F 16/1748 707/693 |
|---|---|---|---|---|
| 8,825,653 | B1* | 9/2014 | Wang | G06F 16/137 707/737 |
| 9,413,527 | B2* | 8/2016 | Yang | H04L 9/0816 |
| 2004/0143713 | A1* | 7/2004 | Niles | G06F 11/1453 711/162 |
| 2011/0016088 | A1* | 1/2011 | Spackman | G06F 11/3428 707/637 |
| 2012/0254126 | A1* | 10/2012 | Mitra | G06F 11/1435 707/687 |
| 2012/0254130 | A1* | 10/2012 | Mitra | G06F 16/13 707/690 |
| 2012/0254565 | A1* | 10/2012 | Mitra | G06F 16/113 711/161 |
| 2013/0018932 | A1* | 1/2013 | Bhaskar | H03M 7/3088 708/203 |
| 2014/0223029 | A1* | 8/2014 | Bhaskar | H03M 7/3088 709/247 |

(Continued)

OTHER PUBLICATIONS

Upadhyay et al., "Deduplication and Compression Techniques in Cloud Design", IEEE 2012, 6 pages.*

*Primary Examiner* — Monica M Pyo
(74) *Attorney, Agent, or Firm* — Womble Bond Dickinson (US) LLP

(57) ABSTRACT

One embodiment provides a computer implemented method of data identification within a deduplication storage system, the method comprising processing multiple units of a segment of data within the deduplication storage system using a fingerprint generation algorithm; storing the internal state generated while processing the multiple units of the segment of data; generating a first fingerprint for the segment of data based on the internal state; reloading the internal state after generating the first fingerprint for the segment of data; and generating a second fingerprint for the segment of data based on a transformed unit of the segment of data.

14 Claims, 8 Drawing Sheets

(56) References Cited

U.S. PATENT DOCUMENTS

2014/0223030 A1\* 8/2014 Bhaskar ............. H03M 7/3088
709/247

\* cited by examiner

ENHANCED FINGERPRINT COMPUTATION FOR DE-DUPLICATED DATA

FIELD OF THE INVENTION

Embodiments of the present invention relate generally to data storage systems. More particularly, embodiments of the invention relate to fingerprint generation for a deduplicated storage device.

BACKGROUND

Disaster recovery procedures for data management enable an organization to recover data after catastrophic events such as fire, or floods, hurricanes, and other natural disasters that present risk to locally stored data. To improve reliability of disaster recovery and meet stringent recovery time objectives imposed by businesses and organizations, are increasingly replicating backups to create an offsite copy of critical data. Backup generation and replication can be made more efficient by applying data deduplication and/or compression. Deduplication and compression of replicated data sets reduces the storage and transmission bandwidth requirements for offsite backup replication. In deduplicated storage systems, multiple stored files or objects may contain and thus reference the same stored chunk of data. A chunk of data within a deduplication storage system may be referred to as a data segment. Fingerprints and other metadata are generated and maintained for stored segments of data and the segment of data is stored only once. The metadata associated with the segments are used to link the stored segments with files or objects.

As the amount of data managed by a deduplication storage system increases into the petabyte range there is a chance that the same fingerprint may be generated for two different data segments. Even though the chances of this happening are quite rare, the likelihood increase as the amount of managed data increases. To mitigate this problem, a deduplication storage device can compute a checksum of the data segment along with the fingerprint and use the checksum and fingerprint in combination to identify the data segment. However, computing the checksum of a data segment is an expensive and iterative process and requires a large amount of compute resources.

SUMMARY OF THE DESCRIPTION

Embodiment described herein provide for a system, method, and apparatus of computing fingerprints for data segments within a deduplicated storage system.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
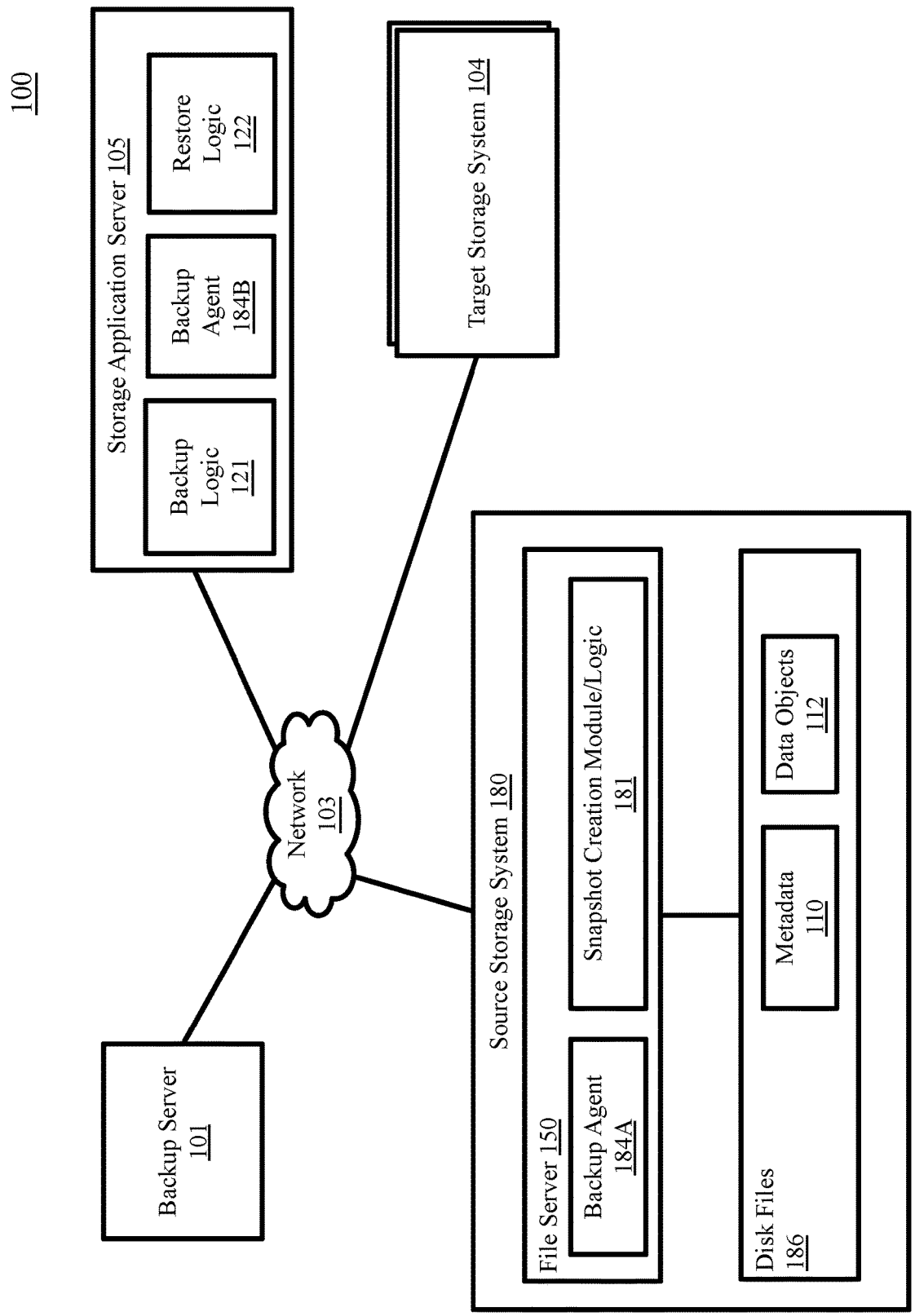
FIG. 1 is a block diagram illustrating a storage system according to an embodiment.

One method of computing a checksum for a data segment includes to read a data stream of a chunk one unit at a time and process the unit in a fingerprint generator. In one embodiment the fingerprint in combination with a checksum for a data chunk forms an effective fingerprint for the data chunk. An effective fingerprint for a data chunk can be generated by processing each unit of the data chunk in a fingerprint generator, then processing the same unit via checksum algorithm. The next unit for the data chunk can then be retrieved until all units (e.g., bytes, words, double words, etc.) of the data chunk are processed. The fingerprint and the checksum can then be used as an effective fingerprint.

In one embodiment, the effective fingerprint processing described above can be reduced to computing the fingerprint of the data chunk once, then creating two independent and uncorrelated fingerprints from the computation. Typically, fingerprint algorithm computation reads and processes the entire data chunk. The data chunk is read in one unit size until the entire data chunk has been read. The fingerprint algorithm processes each and every byte in the data chunk in its fingerprint computation. Often during the processing of the fingerprint algorithm, there is a stage when the final unit of data from the data chunk is read and processed before generating the fingerprint.

In various embodiments, different fingerprint generating algorithms can be used. Each fingerprint-generating algorithm builds some internal state (set of computed values, numbers, variables, indexes, keys, etc. which together describe the state of the fingerprint algorithm), which changes as newer units of data are processed in the fingerprint-generating algorithm. Typically, after a newer data unit is read, the data unit is combined to generate new internal state for the fingerprint algorithm. The combination can be performed either by a linear or non-linear transformation, which can also be iterative, and can have possibly selective dependency over some characteristics of the data unit and the internal state of the fingerprint-generating algorithm. Once all the data units have been processed, the fingerprint is obtained from the internal state of the fingerprint algorithm.

In one embodiment, at the time when the last (e.g., final) unit of data is about to be read by the fingerprint generating algorithm, the internal state of the fingerprint-generating algorithm can be saved such that the internal state can be reloaded for computing a new fingerprint. Subsequently, the final data unit be read and a fingerprint can be computed based on the final data unit. After the fingerprint has been computed, the fingerprint can be stored locally as a base fingerprint and the saved internal state of the fingerprint algorithm can be reloaded into the algorithm. A transformed last unit of data can then be used to compute the second fingerprint. Transformation of the last unit of data can be achieved in multitude of ways. For example and in one embodiment, the last bit of the data unit can be flipped or a value of '1' can be added to the last bit. The transformed last unit of data results in the generation of a second, different fingerprint from the base fingerprint. The second, different fingerprint may be referred to as a derivative fingerprint.

In one embodiment the derived and base fingerprints together can be used as an effective fingerprint to describe the data chunk. The new effective fingerprint generated from the base fingerprint and derived fingerprint is stronger than the base fingerprint. Additionally, the new effective fingerprint is less computationally intensive that generating a checksum to use with the base fingerprint. Accordingly, the techniques provided by embodiment described herein can generate arbitrarily large fingerprints of data chunks with little additional computational overhead relative to the computations used to generate the base fingerprint.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Storage System Overview

FIG. 1 is a block diagram illustrating a storage system 100 in accordance with one of the embodiments described herein. The storage system 100 includes a backup server 101 coupled to a source storage system 180, a target storage system 104, and a storage application server 105 over a network 103. In one embodiment, the backup server 101 is responsible for managing the backup of a plurality of storage systems and managing the replication of those backups to other local or remote storage systems. The backup server 101 can direct the back up, replication, and restoration of files, folders, databases, and hard drives, solid state drives, etc., over a network in order to prevent the loss of data in the event of a hard drive failure, user error, disaster, or accident. In one embodiment, backup server 101 manages backups by making requests to storage application server 105. For example, and in one embodiment, the backup server 101 manages backups based on requests to backup data that are received from other clients being operated by users (e.g., a personal computer, workstation, etc.). In this example, the backup server 101 processes the received requests and makes backup requests to storage application server 105. In this way, the backup server 101 acts a system level client that makes requests to backup data on the backend. Alternatively, the backup server 101 may be a primary storage system (e.g., local data center) that provides storage to one or more clients, which may periodically back up the content stored therein to a remote backup replication storage system (e.g., a disaster recovery site or system), such as the target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. Additionally, the storage system 100 can provide multi-client and/or multi-tenant services.

The network 103 may be any type of network, such as a local area network (LAN), a wide area network (WAN) such as the Internet, a fiber network, a storage network, or a combination thereof. A portion of the network may be wired, wireless, or a combination of wired and wireless. The backup server 101 may be in physical proximity or may be physically remote from client(s), source storage system 180, storage application server 105, or target storage system 104. Moreover, each of the backup server 101, source storage system 180, storage application server 105, and target storage system 104 may be in physical proximity with each other or may be physically remote from each other.

The target storage system 104 may include any type of server or cluster of servers. For example, the target storage system 104 may include a storage server used for at least one of a variety of different purposes—for example, to provide multiple users with access to shared data and/or to back up mission critical data. The target storage system 104 may include, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. The target storage system 104 may have a distributed architecture, or all of its components may be integrated into a single unit. The target storage system 104 may be implemented as part of an archive and/or backup storage system such as a deduplication storage system available from EMC® Corporation of Hopkinton, Mass.

The source storage system 180 may include any type of server or cluster of servers, which may have the same or similar architecture as the architecture of target storage system 104. In one embodiment, source storage system 180 includes a file server 150 and one or more disk file(s) 186. The source storage system 180 may include a storage device having an appliance used to provide NAS capability or a unified storage device (e.g., one which combines NAS and SAN capabilities, a near-line storage device, a DAS device, a tape backup device, or essentially any other type of data storage device. In one embodiment, the file server 150 is an appliance with NAS capability that implements at least one file sharing protocol (e.g., CIFS, SMB, Samba, etc.). The file server 150 can include one or more hard disk drives, solid state drives, or other storage devices, which may be arranged in logical, redundant storage containers (RAID).

In one embodiment, the file server 150 implements a file system (also known as a "filesystem") that controls how data is stored and retrieved. Various file systems may be used. In one embodiment the file server 150 implements the server message block (SMB) protocol, a dialect of the SMB protocol (e.g., CIFS), or an adaptation of the SMB protocol (e.g., Samba), or another protocol that allows applications to remotely read, create, and update files on the file server 150.

In one embodiment, the file server 150 includes a first backup agent 184A, which provides a backup workflow for the one or more file sharing protocols being implemented by the file server 150. In one embodiment, the one or more file sharing protocols include at least one of SMB, CIFS, or Samba. The file server 150, in one embodiment, also includes snapshot creation logic 181 for creating a snapshot of data to be backed up. The snapshot records information of the data at a point in time. It may be a snapshot of the entire file system, or a snapshot of one or more individual files. The snapshot may include information such as data segment references, content handles, etc.

The source storage system 180 also includes one or more disk file(s) 186 that include the data to be backed up to target storage system 104. In one embodiment, the data to be backed up includes metadata 110 and data objects 112. The disk file(s) 186 can be virtual machine (VM) disk file(s) that are the content files of one or more VMs. A virtual machine (VM) represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machine, such as, for example, hardware emulation, full virtualization, para-virtualization, and operating system-level virtualization virtual machines. Different virtual machines hosted by a server (e.g., file server 150, storage application server 105) or a storage system (e.g., source storage system 180, target storage system 104) may have the same or different privilege levels for accessing different resources of the server or storage system. The disk file(s) 186 can also include a second backup agent 184B, which coordinates with the first backup agent 184A to provide a backup workflow for the one or more file sharing protocols being implemented by file server 150.

Source storage system 180 may have a distributed architecture, or all of its components may be integrated into a single unit. Source storage system 180 may be implemented as part of an archive and/or backup system, or a disaster recovery system, such as a continuous replication storage system available from EMC® Corporation of Hopkinton, Mass. In one embodiment, the source storage system 180 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment described herein. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Again, the architecture of the source storage system 180 and the target storage system 104 may be identical or similar. The description provided in connection with the source storage system 180 may be applied to the target storage system 104, or vice versa.

The storage application server 105 can coordinate with the target storage system 104, source storage system 180, and backup server 101 to run various backup operations. The storage application server 105 handles all application operations between the backup server 101 and the backend of the storage system 100—i.e., source storage system 180 and target storage system 104. The storage application server 105 includes any storage service related components configured or adapted to provide storage services (e.g., storage as a service) to a variety of backup servers 101 using any access protocols as is known in the art. For example, the storage application server 105 may include backup logic 121 and restore logic 122. The backup logic 121 is configured to receive requests to back up data from a backup server 101 and to report to the backup server 101 whether the backup operation from the source storage system to the target storage system 104 was successful or unsuccessful. Restore logic 122 is configured to retrieve and restore backup data from target storage system 104 back to source storage system 180 and to report the successful or unsuccessful restoration of the backed up data to backup server 101. The storage application server 105 can also includes a second backup agent 184B, which works with the first backup agent 184A to provide an improved backup workflow for one or more file sharing protocols (e.g., SMB, CIFS, Samba, etc.) being implemented by file server 150. In one embodiment, the storage application server 105 may be integrated with the backup server 101 as a single server or cluster of servers.

In one embodiment of the storage system 100, backup logic 121 on the storage application server 105 is configured to receive requests from the backup server 101 to backup stored data or to replicate stored backup data. The backup logic 121 can report the successful or unsuccessful storage or replication of the backed up data to the target storage system 104. In one embodiment the backup server 101 directs the continuous backup of data from the source storage system 180 via a journaling mechanism that duplicates write operations to the storage system to a remote copy of the source storage system 180. Writes performed to the source storage system can be automatically replicated to the target storage system 104 over the network 103. The journaling can be performed by the first backup agent 184A, which can store write I/O activity to a journal that is stored in associated with the disk file(s) 186 on the source storage system 180. A remote journal can also exist on the target storage system 104. The remote journal can be used to apply write I/O activity to a remote replica of the disk file(s) 186.

As shown in FIG. 1, the to-be-backed-up data (e.g., data objects 112 and metadata 110) resides at the source storage system 180, which includes file server 150 that is implementing a network file sharing protocol such as, but not limited to, the SMB protocol. The first backup agent 184A receives the request from the second backup agent 184B and directs snapshot creation logic 181 to create a snapshot of to-be-backed-up data. In response to the snapshot being created, file server 150 provides the snapshot to target storage system 104 for storage.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Deduplication Storage System

Figure 2:
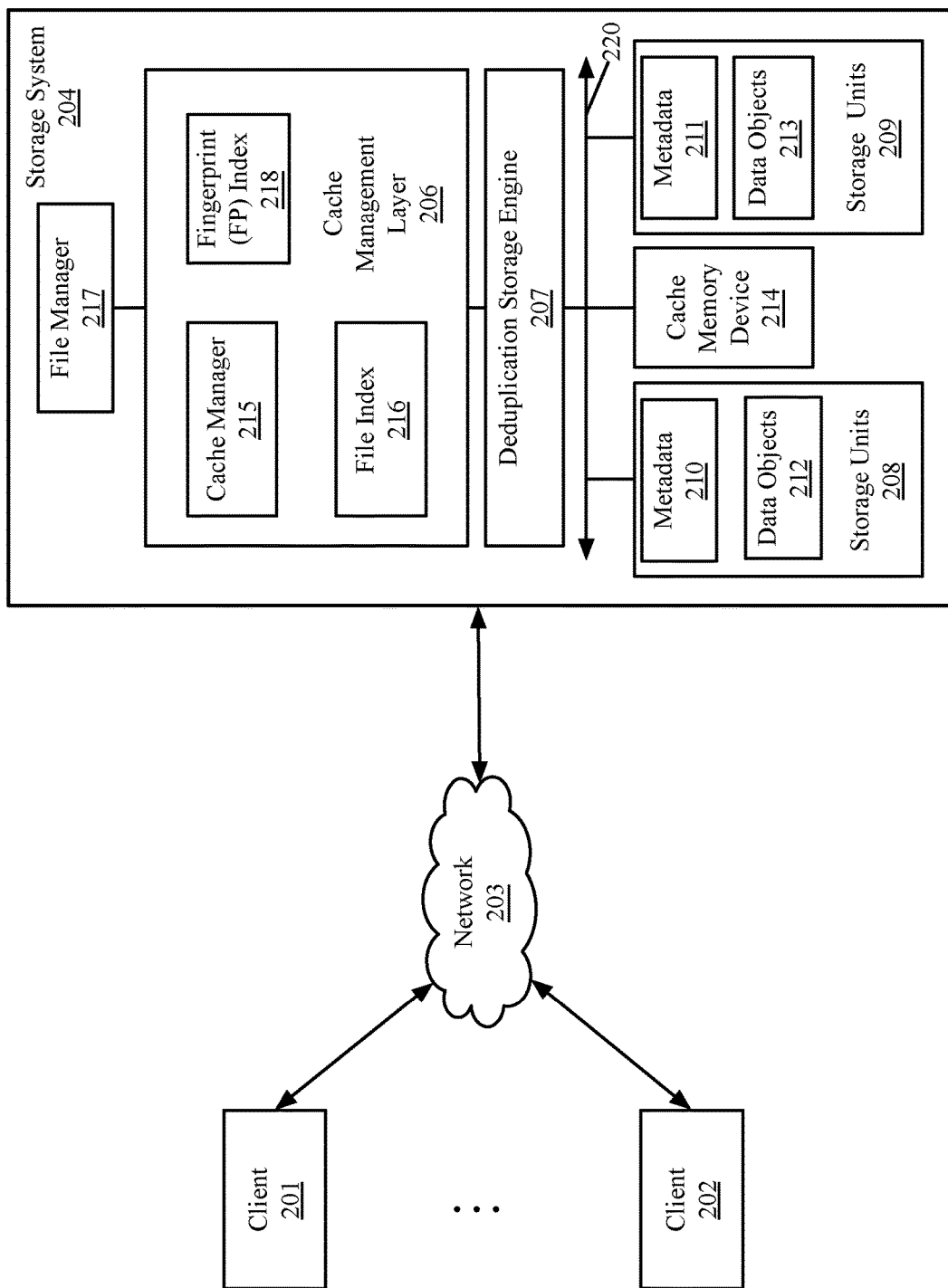
FIG. 2 is a block diagram illustrating an architecture of a storage system including a deduplication storage engine, according to an embodiment.

FIG. 2 is a block diagram illustrating a deduplication storage system 200 according to one embodiment of the invention. The deduplication storage system 200 includes, but is not limited to, one or more client systems, such as client 201 and/or client 202, which are communicatively coupled to the storage system 204 over the network 203. The clients 201, 202 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of the clients 201, 202 may be a primary storage system that provides storage to other local clients, which may periodically back up the content stored therein to a backup storage system, such as the storage system 204. The network 203 may be any type of networks such as a local area network (LAN), a wide area network (WAN) such as the Internet, a fiber network, a storage network, or a combination thereof, wired or wireless. The clients 201, 202 may be in physical proximity or may be physically remote from one another. The storage system 204 may be located in proximity to one, both, or neither of the clients 201, 202.

The storage system 204 may be used as any type of server or cluster of servers. For example, the storage system 204 may be a storage server used for any of various different purposes, such as to provide multiple users with access to shared data and/or to back up data (e.g., mission critical data). In one embodiment, storage system 204 includes, but is not limited to, a file manager 217, a cache management layer 206, a deduplication storage engine 207, storage units 208, 209, and a cache memory device 214 communicatively coupled to each other. The storage units 208, 209 and the cache memory device 214 may be implemented locally (e.g., single node operating environment) or remotely (e.g., multi-node operating environment) via interconnect 220, which may be a bus and/or a network (e.g., a storage network or a network similar to network 203). The storage units 208, 209 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The cache memory device 214 can include one or more of volatile, non-volatile, or a combination of volatile and non-volatile devices.

The file manager 217 may be executed by a processor to provide an interface to access files stored in the storage units 208, 209 and the cache memory device 214. The cache management layer 206 contains a cache manager 215, file index 216, and optionally a fingerprint (FP) index 218. Cache management layer 206 and file manager 217 reside in memory of a processor in one embodiment.

In one embodiment, the file index 216 is used to access data cached in cache memory device 214. The fingerprint index 218 is used to de-duplicate data stored in cache memory device 214 and the storage units 208, 209. In one embodiment the fingerprint index 218 is a partial index that covers a portion of data stored in the cache memory device and/or storage units 208, 209, with the remainder of the fingerprint data stored in the metadata 210, 211 of an associated one of the storage units 208, 209. In one embodiment, the metadata 210, 211 includes a file name, a storage unit where the segments associated with the file name are stored, reconstruction information for the file using the segments, and any other appropriate metadata information related to the files and underlying data objects on each storage unit.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

When data is to be stored in the storage units 208, 209, the deduplication storage engine 207 is configured to segment the file data into multiple chunks (also referred to as segments) according to a variety of segmentation policies or rules. The deduplication storage engine 207 may choose not to store a chunk in a storage unit if the chunk has been previously stored in the storage unit. In the event that the deduplication storage engine 207 does not store the chunk in the storage unit, the deduplication storage engine 207 can store metadata enabling the reconstruction of the file using the previously stored chunk. As a result, chunks of file data are stored in a deduplicated manner as data objects 212, 213 within one or more of the storage units 208, 209. The metadata 210, 211 may be stored in at least some of storage units 208, 209, such that files and associated data objects 212, 213 in a storage unit can be accessed independently of another storage unit. In general, the metadata of each storage unit includes sufficient information to provide access to the files that are backed by the data objects 212, 213 on the storage unit.

Figure 3:
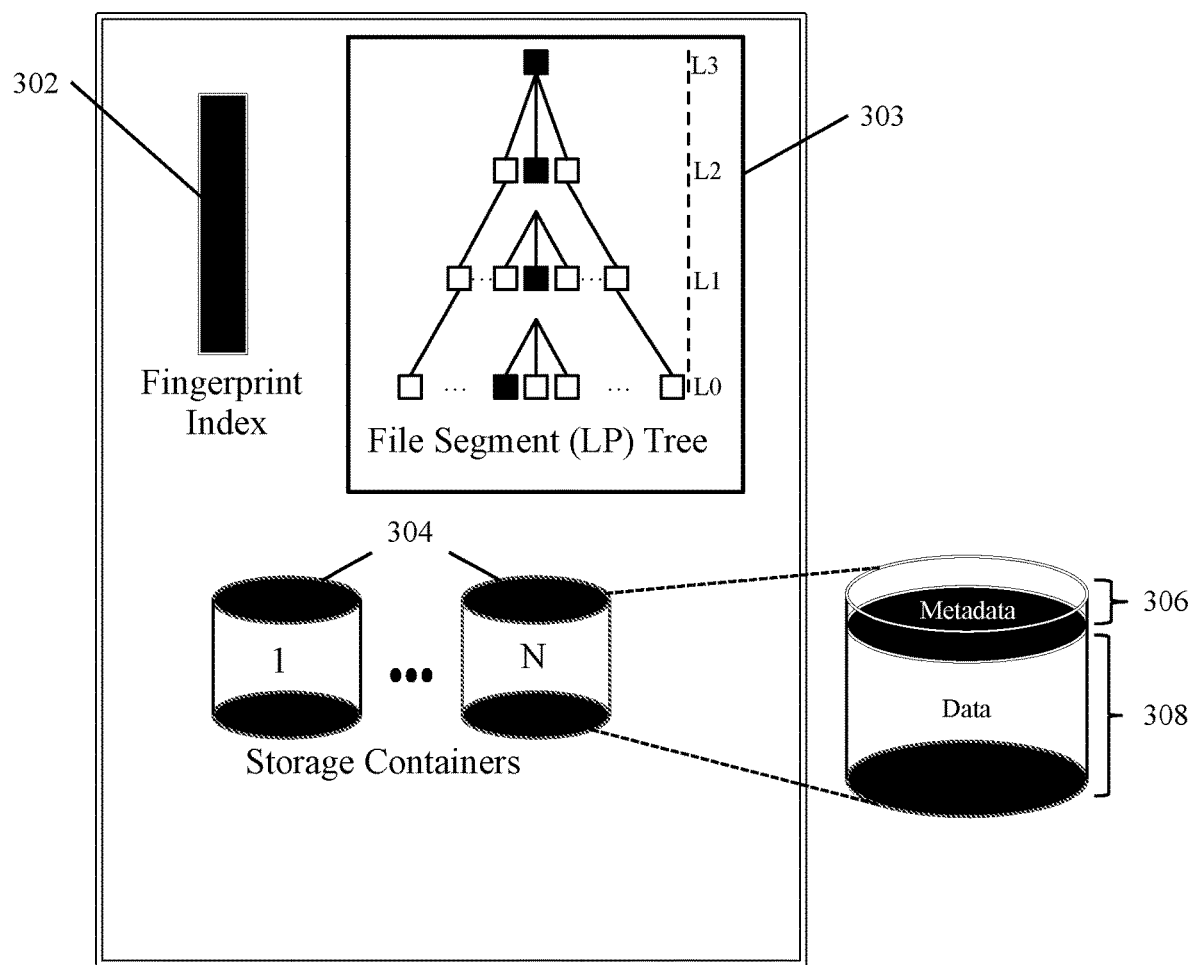
FIG. 3 illustrates a deduplication file system, according to an embodiment.

FIG. 3 illustrates a deduplication file system 300, according to an embodiment. The deduplication file system includes a fingerprint index 302, such as the fingerprint index 218 of FIG. 2, a file segment tree 303, and one or more storage containers 304 including metadata 306 and data 308. One or more of the storage containers 304 can be stored on each of the storage units 208, 209 of FIG. 2. The metadata 306 can contain at least a portion of the metadata 210, 211 of FIG. 2. The data 308 can contain at least a portion of the data objects 212, 213 of FIG. 3.

In one embodiment the fingerprint index 302 is a portion of the metadata 306 on the storage containers 304 and at least a portion of the fingerprint index 302 is stored or cached in memory. The fingerprint index 302 stores information to determine which of the storage containers 304 on which data referenced by a fingerprint is stored. In one embodiment the fingerprint index 302 stores fingerprint data in the form of fingerprint and container identifier pairs (e.g., <FP,CID>) which associate a fingerprint with a container identifier storing the storage segment associated with the fingerprint.

The file segment tree 303 is a portion of the metadata 306 that enables the deduplication file system 300 to reconstruct a file from the underlying data 308. The file segment tree 303 may be referred to as an LP segment tree. In one embodiment the file segment tree 303 is a Merkle tree that may have multiple levels depending on the size of the file. The level zero (L0) segments of the tree are segments with user data. Each L0 segment is identified by a fingerprint, which is one of the fingerprints stored in the fingerprint index 302. The fingerprints are content based fingerprints, such as a hash of the L0 data segment. A level one (L1) segment references one or more L0 segments via content based fingerprints. One or more L1 segments can then be referenced by a level 2 (L2) segment, up to the root node of the tree. Accordingly, the L0 segments contain the data 308 within the storage containers 304. In some embodiments segments in layers L1 and up, referred to as LP segments are also stored in the data 308 and each LP segment also has an associated stored in the metadata 306 and in the fingerprint index 302. Segments can be shared among multiple files and in one embodiment may be compressed and packed within a compression region. Multiple compression regions may be packed into a storage container.

Fingerprint Generation

Embodiments described herein enable the generation of arbitrarily large fingerprints of deduplication data segments with little additional computational overhead relative to the generation of a base fingerprint for the segment. In one embodiment, internal state of a fingerprint algorithm is stored prior to processing the final unit of a data segment. The final unit of the data segment can then be processed to generate a base fingerprint, then the internal state can be reloaded and an arbitrary number of derived fingerprints can be generated by modifying and re-processing the final unit of the data segment. The base fingerprint and one or more derived fingerprints can be combined into an effective fingerprint for the data segment. The effective fingerprint enables tracking billions of distinct data segments without risk of fingerprint collision and without incurring the additional computational overhead of associated with generating a checksum for each data segment.

Figure 4:
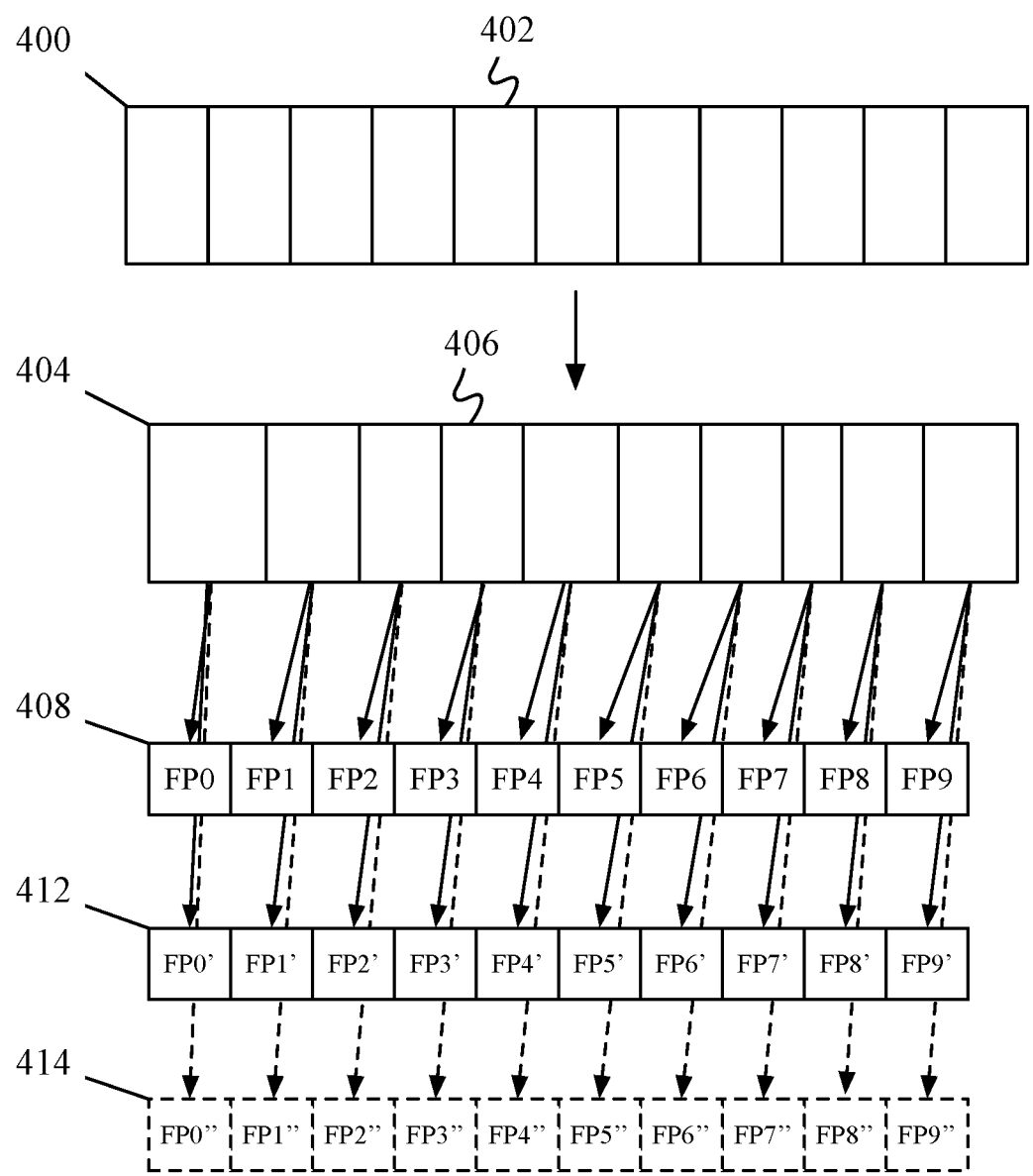
FIG. 4 is a block diagram illustrating fingerprint generation, according to an embodiment.

FIG. 4 is a block diagram illustrating fingerprint generation, according to an embodiment. In one embodiment, data 400 can be source data of the type stored on a source stage system 180 of FIG. 1. The data 400 can be divided into a plurality of blocks (e.g., block 402). In one embodiment, data blocks are associated with physical regions of data, where the data blocks are of a fixed size and boundaries between blocks are at fixed locations. In one embodiments, an entire data block can read or written in a single operation.

Data 400 can be stored as data 404, which can be data stored in a backup storage device, such as the target storage system 104 of FIG. 1. Data 402 is divided into segments (e.g., segment 406). In some embodiments, segments are of a fixed size. In the example shown, segments are of variable sizes. The segments of data 404 may be larger, smaller, or the same size as the blocks of data 400. Segments are located in a storage device using fingerprints. For example, a fingerprint is used to look up the stored location for a segment on a backup storage device. The segment can then be retrieved from the backup storage device using the identified stored location.

In some embodiments, if two segments present in data 404 are identical, the data stored in those segments is only stored in the storage device once, and the fingerprint information is repeated when generating a snapshot of data 404 to indicate that the data was originally present twice. In some embodiments, the function used to compute the segment boundaries is designed to segment repeated data in predictable locations, e.g., to create as many identical segments as possible in the case of repeated data. Fingerprint generation logic can be used to generate fingerprints used to identify segments of data (e.g. segment 406). In various embodiments, different fingerprint generation algorithms may be used, such as the Rabin fingerprint algorithm, a secure hash algorithm (e.g., SHA-1), or any other appropriate algorithm. The fingerprint can be used to map an arbitrarily large data item such as a block or segment to a much shorter bit string. Snapshots of the data 404 can then generated by storing fingerprints identifying the segments of the data 404. Duplicate segments need only be stored once and, in one embodiment, multiple fingerprint entries in the snapshot can be used to indicate multiple instances of duplicate data.

The fingerprint generation logic can generate a set of base fingerprints 408, and one or more sets of derived fingerprints 412, 414. An effective fingerprint can then be generated for each segment by combining the a base fingerprint (e.g., FP0) with a derived fingerprint (e.g., FR0'). An arbitrarily long effective fingerprint can be generated based on the number of derived fingerprints that are generated (e.g., FP0', FP0", etc.).

Figure 5:
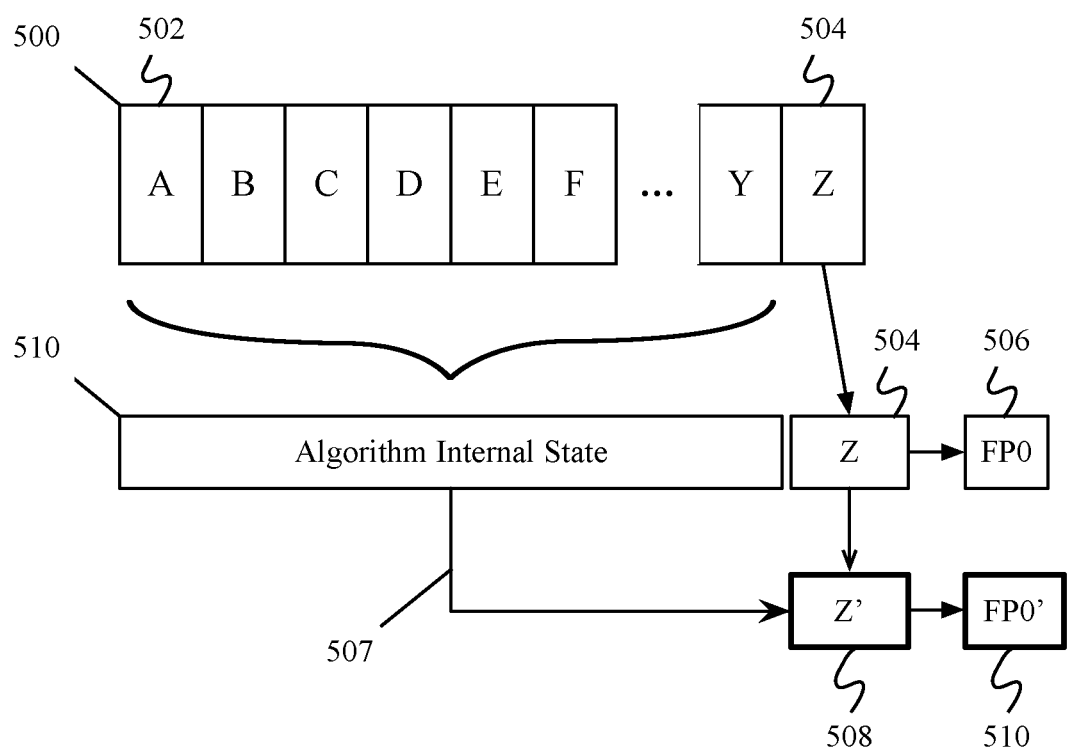
FIG. 5 is a block diagram illustrating additional detail on fingerprint generation, according to an embodiment.

FIG. 5 is a block diagram illustrating additional detail on fingerprint generation, according to an embodiment. A data segment 500 is illustrated having a first unit 502 and a final unit 504. In one embodiment each unit can be a byte, word, or double word. However, some embodiments may process a unit of any size. Depending on the size of the unit, a data segment 500 may be divided into any number of units and is not limited to the number of units depicted in FIG. 5.

In various embodiments, different fingerprint generating algorithms can be used to generate a fingerprint for a data segment. Each fingerprint-generating algorithm builds an internal state 510, which is a set of computed values, numbers, variables, indexes, keys, and other data that describes computational state of the fingerprint algorithm. The algorithm internal state 510 can change as newer units of data are processed in the fingerprint-generating algorithm. In one embodiment when a new data unit for the data segment 500 is read, the data unit is combined with existing data and an updated algorithm internal state 510 is generated. In one embodiment the new unit is combined via a linear transformation. In one embodiment the new unit is combined via a non-linear transformation. The transformation can be iterative. The transformation can also have a selective dependency over some characteristics of the data unit and the algorithm internal state 510. Once all data units of the segment 500 are processed, a fingerprint can be generated based on the algorithm internal state 510.

In one embodiment, at the time when the final unit 504 of the segment 500 is about to be read by a fingerprint generating algorithm, the algorithm internal state 510 can be saved such that the algorithm internal state 510 can be reloaded. The final data unit 504 can then be read and the combination of the final unit 504 and the algorithm internal state 510 can be used to obtain a base fingerprint 506. After the base fingerprint 506 has been computed, the saved instance of the algorithm internal state 510 can be reloaded (507). A transformed last unit 508 of the segment 500 can then be used to compute a derived fingerprint 510.

Figure 6:
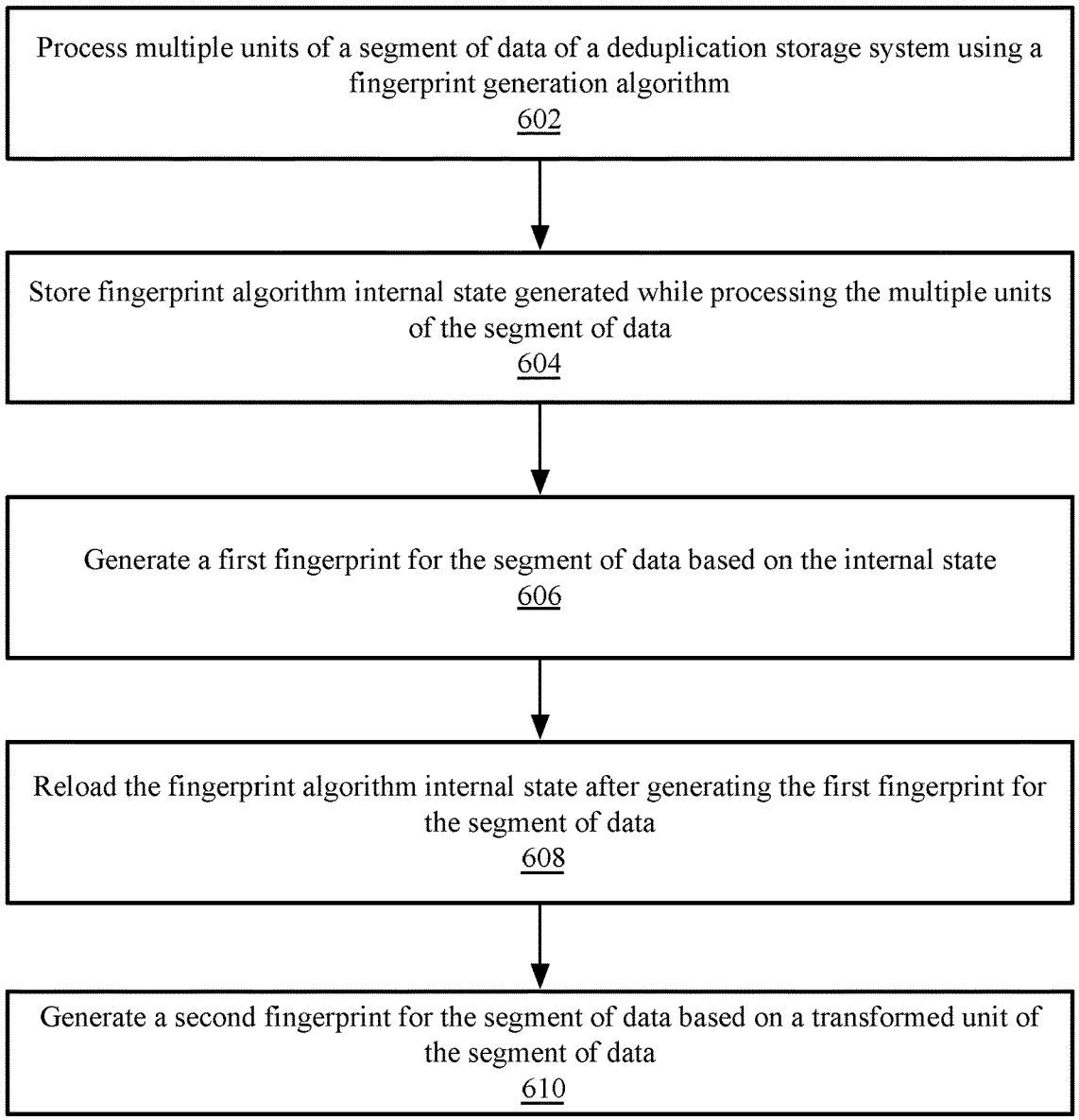
FIG. 6 is a flow diagram of fingerprint generation logic, according to an embodiment.

FIG. 6 is a flow diagram of fingerprint generation logic 600, according to an embodiment. The fingerprint generation logic can generate base and derived fingerprints as illustrated in FIG. 4 and FIG. 5.

The fingerprint generation logic 600 can process multiple units of a segment of data of a deduplication storage system using a fingerprint generation algorithm, as shown at 602. The fingerprint generation algorithm can be any appropriate fingerprint generation algorithm, such as the Rabin fingerprint algorithm or a secure hash algorithm (e.g., SHA-1, SHA-2, etc.).

The fingerprint generation logic 600 can store fingerprint algorithm internal state generated while processing the multiple units of the segment of data, as shown at 604. In one embodiment the algorithm internal state is stored before processing a final unit of the segment of data. In one embodiment the processed unit size of the segment of data is one byte or a multiple of one byte (e.g., two, four, or eight bytes). In one embodiment the processed unit size is one word of the host processor architecture or instruction set architecture. In one embodiment the processed unit size is one double word of the host processor architecture or instruction set architecture.

The fingerprint generation logic 600 can then generate a first fingerprint for the segment of data based on the internal state, as shown at 606. In one embodiment the fingerprint generation logic 600 generates the first fingerprint (e.g., base fingerprint) using the internal state and a final unit of the data segment. In one embodiment the final unit of the data segment can be loaded and processed after the fingerprint algorithm internal state is stored, as shown at 604.

After generating the first fingerprint, the fingerprint generation logic 600 can reload the fingerprint algorithm internal state after generating the first fingerprint for the segment of data, as shown at 608. Using the reloaded internal state, the fingerprint generation logic 600 can generate a second fingerprint for the segment of data based on a transformed unit of the segment of data, as shown at 610. In one embodiment the fingerprint generation logic 600 can transform the final unit of the data segment and used the transformed final unit to generate the second (derived) fingerprint. The transformation can be performed, for example, by modifying one or more bits within the final unit of the segment of data. In one embodiment, the final bit within the final unit of the segment of data can be modified. However, modifying any bit of the final unit, even when combined with the saved algorithm internal state, results in a completely different derived fingerprint relative to the base fingerprint when processed by the fingerprint generation algorithm.

Figure 7:
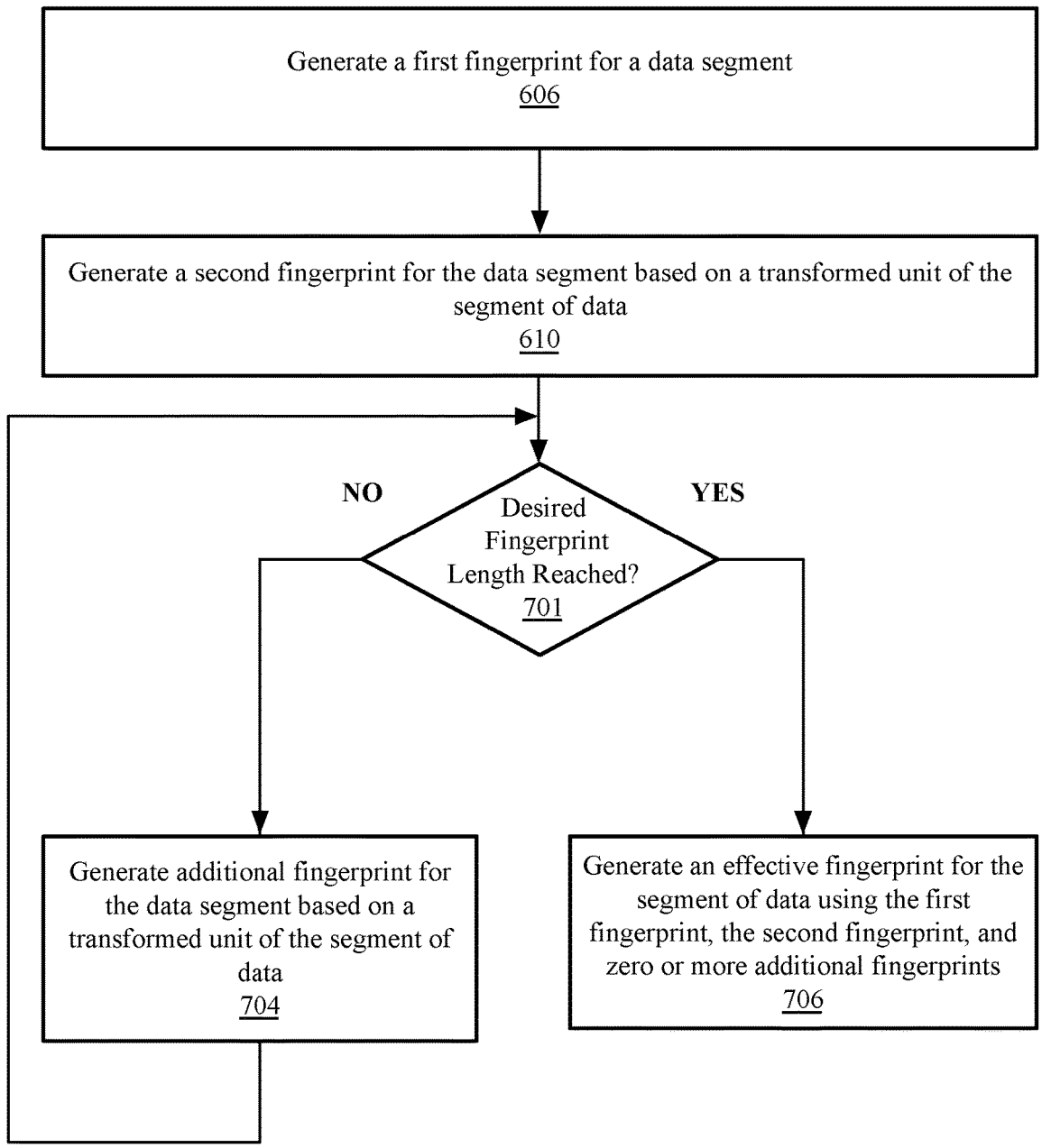
FIG. 7 is a flow diagram of a process for generating an effective fingerprint, according to an embodiment.

FIG. 7 is a flow diagram of a process 700 for generating an effective fingerprint, according to an embodiment. An effective fingerprint for a data segment of a deduplication storage system can be generated using a first and second fingerprint generated according to fingerprint generation logic, such as the fingerprint generation logic 600 of FIG. 6. As illustrated, zero or more additional fingerprints can also be used depending on a desired effective fingerprint length.

For example and in one embodiment, fingerprint generation logic can generate a first fingerprint at 606 and a second fingerprint at 610, as described with respect to FIG. 6. The logic can then determine if a desired length of the effective fingerprint has been reached at 701. If the desired length of the effective fingerprint has not been reached, the logic can generate an additional fingerprint for the data segment based on a transformed unit of the segment of data, as shown at 704. Once the desired length of the effective fingerprint has been reached, as determined at 701, the logic can generate an effective fingerprint for the segment of data using the first fingerprint, the second fingerprint, and zero or more additional fingerprints, as shown at 706.

Figure 8:
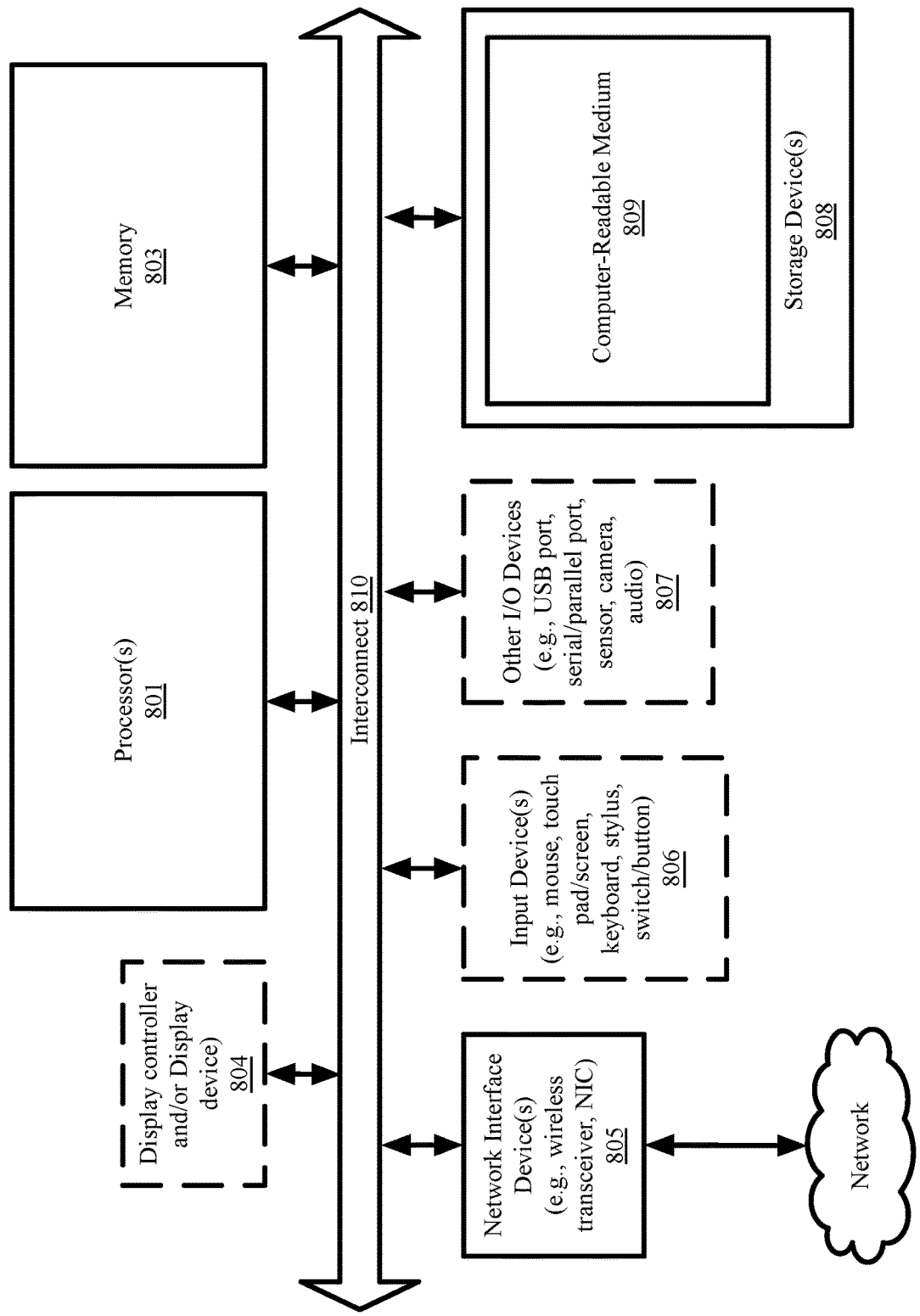
FIG. 8 is a block diagram illustrating an example of a data processing system that may be used with embodiments described herein.

FIG. 8 is a block diagram illustrating an example of a data processing system 800 that may be used with embodiments described herein. The data processing system 800 may represent any of the data processing systems described above and may perform any of the processes or methods described above. The data processing system 800 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 800 is intended to show a high-level view of many components of the computer system. However, it is to be understood that additional components may be present in certain implementations and furthermore, different arrangement of the components shown may occur in other implementations. The data processing system 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 800 includes one or more processor(s) 801, memory 803, network interface devices, 805, I/O devices, 806, 807 and storage device(s) 808 connected via a bus or an interconnect 810. The one or more processor(s) 801 may be a single processor or multiple processors with a single processor core or multiple processor cores included therein. The processor(s) 801 may represent one or more general-purpose processors such as a microprocessor, a central processing unit (CPU), or the like. More particularly, the processor(s) 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 801 may be a low power multi-core processor, such as an ultra-low voltage processor, and may act as a main processing unit and central hub for communication with the various components of the system. Such processor can be implemented as a system on chip (SoC). The processor(s) 801 are configured to execute instructions for performing the operations and steps discussed herein. The data processing system 800 may further include a graphics/display subsystem 804, which may include a display controller, a graphics processor, and/or a display device. In one embodiment at least a portion of the graphics/display subsystem 804 is integrated into the processors(s)

801. The graphics/display subsystem 804 is optional and some embodiments may not include one or more components of the graphics/display subsystem 804.

The processor(s) 801 communicates with memory 803, which in one embodiment can be implemented via multiple memory devices to provide for a given amount of system memory. The memory 803 may include one or more volatile storage (or memory) devices such as random access memory (RAM), dynamic RAM (DRAM), synchronous DRAM (SDRAM), static RAM (SRAM), or other types of storage devices. The memory 803 may store information including sequences of instructions that are executed by the one or more processor(s) 801 or any other device. For example, executable code and/or data of a variety of operating systems, device drivers, firmware (e.g., input output basic system or BIOS), and/or applications can be loaded in the memory 803 and executed by one of the processor(s) 801. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 800 may further include I/O devices such as a network interface device(s) 805, input device(s) 806, and other I/O device(s) 807. Some of the input device(s) 806 and other I/O device(s) 807 may be optional and are excluded in some embodiments. The network interface device(s) 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 806 may include a mouse, a touch pad, a touch sensitive screen (which may be integrated with a display device of the graphics/display subsystem 804), a pointer device such as a stylus, and/or a keyboard (e.g., physical keyboard or a virtual keyboard displayed as part of a touch sensitive screen). For example, the input device(s) 806 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 807 may also include an audio device. An audio device may include a speaker and/or a microphone to facilitate voice-enabled functions, such as voice recognition, voice replication, digital recording, and/or telephony functions. The other I/O device(s) 807 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of data processing system 800.

To provide for persistent storage of information such as data, applications, one or more operating systems and so forth, a mass storage (not shown) may also couple to the processor(s) 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 801, e.g., via a serial peripheral interface (SPI). This flash device may provide for non-volatile storage of system software, including a basic input/output software (BIOS) as well as other firmware of the system.

The storage device(s) 808 may include computer-readable storage medium 809 (also known as a machine-readable storage medium) on which is stored one or more sets of instructions or software embodying any one or more of the methodologies or functions described herein. The computer-readable storage medium 809 may also be used to store the some software functionalities described above persistently. While the computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 800 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a computer implemented method of data identification within a deduplication storage system, the method comprising processing multiple units of a segment of data of the deduplication storage system using a fingerprint generation algorithm; storing fingerprint algorithm internal state generated while processing the multiple units of the segment of data; generating a first fingerprint for the segment of data based on the fingerprint algorithm internal state; reloading the fingerprint algorithm internal state after generating the first fingerprint for the segment of data; and generating a second fingerprint for the segment of data based on a transformed unit of the segment of data.

One embodiment provides for a deduplication data storage system comprising one or more processing devices a deduplicated storage device to store deduplication data segments; fingerprint generation logic to generate fingerprints for the deduplication data segments via the one or more processing devices, the fingerprint generation logic to process multiple units of a deduplication data segment using a fingerprint generation algorithm; store fingerprint algorithm internal state generated while the multiple units of the segment of data are processed; generate a first fingerprint for the segment of data based on the fingerprint algorithm internal state; reload the fingerprint algorithm internal state after the first fingerprint for the segment of data is generated; generate a second fingerprint for the segment of data based on a transformed unit of the segment of data; and generate an effective fingerprint for the segment of data based on the first fingerprint and the second fingerprint.

One embodiment provides for a non-transitory computer-readable medium storing instructions which, when executed by one or more processors, cause the one or more processors to perform an operation to identify data within a deduplication storage system, the operation comprising initially processing a first unit of a segment of data using a fingerprint generation algorithm; building an initial fingerprint algorithm internal state based on a set of computed values describing a computational state of the fingerprint generation algorithm after processing the first unit of the segment of data; processing multiple units of a segment of data within the deduplication storage system using a fingerprint generation algorithm; storing the fingerprint algorithm internal state generated while processing the multiple units of the segment of data; generating a first fingerprint for the segment of data based on the fingerprint algorithm internal state; reloading the fingerprint algorithm internal state after generating the first fingerprint for the segment of data; generating a second fingerprint for the segment of data based on a transformed unit of the segment of data; and generating an effective fingerprint for the segment of data based on the first fingerprint and the second fingerprint.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A computer implemented method of data identification within a deduplication storage system, the method comprising:
    processing multiple units of a segment of data of the deduplication storage system using a fingerprint generation algorithm;
    storing fingerprint algorithm internal state generated while processing the multiple units of the segment of data;
    generating a first fingerprint for the segment of data based on the fingerprint algorithm internal state, wherein generating the first fingerprint includes loading a final unit of the segment of data and generating the first fingerprint based on the fingerprint algorithm internal state and the final unit of the segment of data;
    reloading the fingerprint algorithm internal state after generating the first fingerprint for the segment of data;
    generating a second fingerprint for the segment of data different from the first fingerprint, by transforming the final unit of the segment of data; and
    generating an effective fingerprint for the segment of data based on the first fingerprint and the second fingerprint.

2. The computer implemented method as in claim 1, wherein storing the fingerprint algorithm internal state generated while processing the multiple units of the segment of data includes storing the fingerprint algorithm internal state before loading the final unit of the segment of data.

3. The computer implemented method as in claim 2, wherein reloading the fingerprint algorithm internal state includes reloading the fingerprint algorithm internal state after loading the final unit of the segment of data.

4. The computer implemented method as in claim 1, wherein transforming the final unit of the segment of data includes modifying one or more bits within the final unit of the segment of data.

5. The computer implemented method as in claim 4, wherein modifying a bit within the final unit of the segment of data includes modifying a final bit within the final unit of the segment of data.

6. The computer implemented method as in claim 5, wherein a size of the unit of the segment of data is one byte or a multiple of one byte.

7. The method as in claim 6, wherein a size of the unit of the segment of data is one word or one double word.

8. The computer implemented method as in claim 1, additionally comprising:
   initially processing a first unit of a segment of data using the fingerprint generation algorithm; and
   building an initial fingerprint algorithm internal state based on a set of computed values describing a computational state of the fingerprint algorithm after processing the first unit of the segment of data.

9. A deduplication data storage system comprising: one or more processing devices;
   a deduplicated storage device to store deduplication data segments; fingerprint generation logic to generate fingerprints for the deduplication data segments via the one or more processing devices, the fingerprint generation logic to:
   process multiple units of a deduplication data segment using a fingerprint generation algorithm;
   store fingerprint algorithm internal state generated while the multiple units of the segment of data are processed;
   generate a first fingerprint for the segment of data based on the fingerprint algorithm internal state, wherein to generate the first fingerprint includes to load a final unit of the segment of data and generate the first fingerprint based on the fingerprint algorithm internal state and the final unit of the segment of data;
   reload the fingerprint algorithm internal state after the first fingerprint for the segment of data is generated;
   generate a second fingerprint for the segment of data different from the first fingerprint by transforming the final unit of the segment of data; and
   generate an effective fingerprint for the segment of data based on the first fingerprint and the second fingerprint.

10. The deduplication data storage system as in claim 9, wherein to store the fingerprint algorithm internal state includes to store the fingerprint algorithm internal state before the final unit of the segment of data is loaded and to reload the fingerprint algorithm internal state includes to reload the fingerprint algorithm internal state after the final unit of the segment of data is loaded.

11. The deduplication data storage system as in claim 9, wherein to transform the final unit of the segment of data includes to modify a bit within the final unit of the segment of data.

12. The deduplication data storage system as in claim 9, wherein a size of a unit of the segment of data is a byte, word, or double word.

13. A non-transitory computer-readable medium storing instructions which, when executed by one or more processors, cause the one or more processors to perform an operation to identify data within a deduplication storage system, the operation comprising:
   initially processing a first unit of a segment of data using a fingerprint generation algorithm;
   building an initial fingerprint algorithm internal state based on a set of computed values describing a computational state of the fingerprint generation algorithm after processing the first unit of the segment of data;
   processing multiple units of a segment of data within the deduplication storage system using a fingerprint generation algorithm;
   storing the fingerprint algorithm internal state generated while processing the multiple units of the segment of data;
   generating a first fingerprint for the segment of data based on the fingerprint algorithm internal state, wherein generating the first fingerprint includes loading a final unit of the segment of data and generating the first fingerprint based on the fingerprint algorithm internal state and the final unit of the segment of data;
   reloading the fingerprint algorithm internal state after generating the first fingerprint for the segment of data;
   generating a second fingerprint for the segment of data different from the first fingerprint by transforming the final unit of the segment of data; and
   generating an effective fingerprint for the segment of data based on the first fingerprint and the second fingerprint.

14. The non-transitory computer-readable medium as in claim 13, wherein reloading the fingerprint algorithm internal state includes reloading the fingerprint algorithm internal state after loading the final unit of the segment of data, generating the second fingerprint for the segment of data includes modifying a bit within the final unit of the segment of data and generating the second fingerprint based on the transformed final unit of the segment of data and the reloaded fingerprint algorithm internal state.

* * * * *